United States Patent
Fujita

(10) Patent No.: US 7,352,101 B2
(45) Date of Patent: Apr. 1, 2008

(54) SKEW SHAPE VARIABLE LAMINATED IRON CORE AND METHOD OF MANUFACTURING THE SAME

(75) Inventor: Katsufusa Fujita, Fukuoka (JP)

(73) Assignee: Mitsui High-tec, Inc., Fukuoka (JP)

( * ) Notice: Subject to any disclaimer, the term of this patent is extended or adjusted under 35 U.S.C. 154(b) by 0 days.

(21) Appl. No.: 10/542,394

(22) PCT Filed: Apr. 14, 2004

(86) PCT No.: PCT/JP2004/005307

§ 371 (c)(1),
(2), (4) Date: Jul. 13, 2005

(87) PCT Pub. No.: WO2004/095677

PCT Pub. Date: Nov. 4, 2004

(65) Prior Publication Data
US 2006/0108891 A1    May 25, 2006

(30) Foreign Application Priority Data
Apr. 23, 2003 (JP) .............................. 2003-118562

(51) Int. Cl.
*H02K 1/06* (2006.01)
(52) U.S. Cl. .................................................. 310/217
(58) Field of Classification Search ................ 310/216, 310/217, 254, 261; 336/210–212, 219, 234
See application file for complete search history.

(56) References Cited
U.S. PATENT DOCUMENTS

| | | | | | |
|---|---|---|---|---|---|
| 3,590,208 | A | * | 6/1971 | Martini et al. ................ | 219/92 |
| 5,338,996 | A | * | 8/1994 | Yamamoto .................... | 310/217 |
| 5,923,112 | A | * | 7/1999 | Bertocchi et al. ............ | 310/217 |
| 6,252,329 | B1 | * | 6/2001 | Del Fabbro .................. | 310/217 |
| 6,984,913 | B2 | * | 1/2006 | Neuenschwander ......... | 310/216 |

FOREIGN PATENT DOCUMENTS

| | | | | | |
|---|---|---|---|---|---|
| JP | 358116033 | A | * | 7/1983 | .................. 310/217 |
| JP | 363213433 | A | * | 9/1988 | .................. 310/217 |
| JP | 5-56608 | | | 3/1993 | |
| JP | 9-117112 | | | 5/1997 | |
| JP | 11155246 | | | 6/1999 | |
| JP | 2001103693 | | | 4/2001 | |
| JP | 2002136015 | | | 5/2002 | |
| JP | 2002-354717 | A | | 12/2002 | |

* cited by examiner

*Primary Examiner*—Tran Nguyen
(74) *Attorney, Agent, or Firm*—Wood, Phillips, Katz, Clark & Mortimer

(57) ABSTRACT

In a laminated iron core in which plural iron core pieces are laminated through caulking projections and caulking holes in which the caulking projections are fitted, and in the iron core pieces except a lowermost layer, the caulking projections and the caulking holes are formed at different positions of a same radius from a rotation center at skewing of the iron core pieces, and the caulking hole is longer in a circumferential direction than the caulking projection fitted in the caulking hole, and when the caulking projection of the iron core piece of an upper layer is fitted in the caulking hole of the iron core piece, a gap is formed in the circumferential direction of each of the caulking holes.

11 Claims, 6 Drawing Sheets

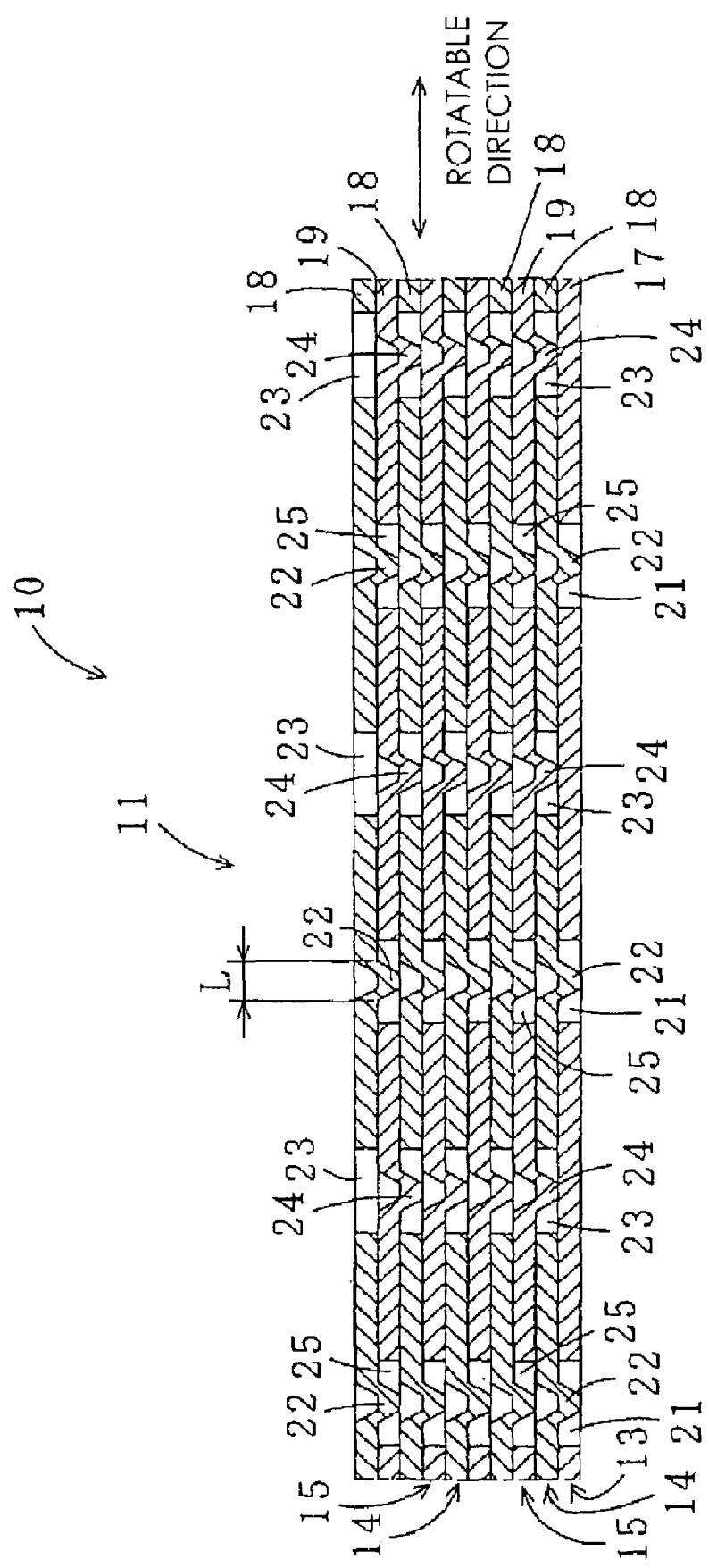

SKEW SHAPE VARIABLE LAMINATED IRON CORE AND METHOD OF MANUFACTURING THE SAME

BACKGROUND OF THE INVENTION

1. Field of the Invention

The present invention relates to a laminated iron core in which a skew shape becomes variable after caulking lamination and a manufacturing method of the same.

2. Background Art

In a motor, a rotator laminated iron core formed by caulking and laminating rotator iron core pieces punched out from a metal thin plate by a die apparatus is rotatably incorporated in the inside of a stator laminated iron core formed by caulking and laminating stator iron core pieces punched out from a metal thin plate by the die apparatus.

Incidentally, in order to prevent a cogging phenomenon from occurring at a time of operation of a motor, for example, when the rotator laminated iron core is manufactured, the rotator iron core pieces are caulked and laminated while being skewed.

Here, JP-A-5-56608 discloses a skew formed in such a manner that when a punched rotator iron core piece is laminated on a previously punched rotator iron core piece, caulking lamination is performed while shifting a position of a caulked position by rotating the previously punched rotator iron core piece side by a specified angle (skew angle).

As stated above, although the skew can be simultaneously formed when the rotator iron core pieces are caulked and laminated to form the rotator laminated iron core, the primary object of the caulking lamination is to form the rotator laminated iron core by caulking and joining the respective rotator iron core pieces.

Thus, when the rotator laminated iron core is manufactured, although the skew can be formed as stated above, after the rotator laminated iron core is once manufactured, the skew shape can not be changed.

Further, the skew shape can not be changed in the manufactured rotator laminated iron core, in the case where the use mode or the use object of a motor is changed halfway, measures against that become insufficient, and there is a high possibility that the cogging phenomenon and noise occur at the time of operation of the motor.

The invention has been made in view of such circumstances, and has an object to provide a skew shape variable laminated iron core in which even after caulking lamination, a skew shape can be freely changed according to various uses of a motor, and a manufacturing method of the same.

SUMMARY OF THE INVENTION

The gist of a skew shape variable laminated iron core of the invention and a manufacturing method of the same to solve the above problems includes the following (1) to (5).

(1) A laminated iron core in which plural iron core pieces are laminated through caulking projections and caulking holes in which the caulking projections are fitted, characterized in that in the iron core pieces except a lowermost layer, the caulking projections and the caulking holes are respectively formed at different positions having a same radius from a rotation center at skewing of the iron core pieces, and the caulking hole is longer in a circumferential direction than the caulking projection fitted in the caulking hole, and when the caulking projection of the iron core piece of an upper layer is fitted in the caulking hole of the iron core piece, a gap is formed in the circumferential direction of each of the caulking holes.

(2) The caulking hole may have an arc shape when viewed from the rotation center at the skewing.

(3) The caulking hole may be formed to pass through the plural laminated iron core pieces, and the caulking projection fitted in the caulking hole formed to pass through reaches to a lower part position of the caulking hole formed to pass through.

(4) The caulking holes may include a first caulking hole formed in every second iron core piece of the iron core pieces in a lamination direction, and a second caulking hole formed at a position different from the first caulking hole and to pass through the plural laminated iron core pieces, and the caulking projections may include a first caulking projection reaching to a lower part position of the first caulking hole, and a second caulking projection reaching to a lower part position of the second caulking hole.

(5) There are included a step of forming a caulking hole in a lowermost layer iron core piece, and forming caulking projections and caulking holes respectively in iron core pieces except the lowermost layer at a same radius position from a rotation center at skewing and at different positions, and a step of forming a laminated iron core by fitting the caulking projection of the iron core piece of an upper layer into the caulking hole of the iron core piece of a lower layer, characterized in that the caulking hole is formed to be longer than the caulking projection in a direction of a circumference with the rotation axis as a center, and when the caulking projection of the iron core piece of the upper layer is fitted into the caulking hole of the iron core piece of the lower layer, a gap is formed between the caulking hole and the caulking projection and in the circumferential direction.

According to the structure of (1), since the caulking projection and the caulking hole are respectively formed at the different positions of the same radius from the rotation center at the skewing of the iron core piece, when the iron core pieces are caulked and laminated, caulking connecting places including the caulking projections and the caulking holes are arranged on the same radius from the rotation center at the skewing.

When the caulking projection of the iron core piece of the upper layer is fitted into the caulking hole of the iron core piece of the lower layer, the gap is formed between the caulking hole and the caulking projection at both sides or the single side in the circumferential direction.

Accordingly, when the iron core piece of the upper layer is shifted with respect to the iron core piece of the lower layer in the direction where the gap is formed, the iron core piece of the upper layer can be rotated within an angle of a center angle with this gap as an arc length.

Thus, in the laminated iron core subjected to the caulking lamination, the respective laminated iron core pieces can be mutually rotated around the rotation center at the skewing.

Thus, after the laminated iron core is formed, when a rotation force is given to each of the iron core pieces constituting the laminated iron core to make a rotation in the direction where the gap is formed, a freely shaped skew can be formed in the laminated iron core.

Further, the plural caulking projections and the plural caulking holes are formed in each of the iron core pieces, so that the number of the caulking connecting places is increased, and the caulking lamination force between the respective iron core pieces can be increased.

Besides, also when the iron core piece is rotated, the outer shape of the laminated iron core when viewed from a plane or a side is not changed.

Incidentally, it is desirable that the caulking-projections and the caulking holes are arranged to become symmetrical with respect to the rotation center at the skewing from the viewpoint of improvement in shape accuracy and caulking strength of the laminated iron core.

Besides, as in the structure of (2), when the caulking hole is made to have the arc shape when viewed from the rotation center at the skewing, the fitted caulking projection can be easily rotated in the caulking hole while maintaining the caulking joining force.

Here, when the number of magnetic poles is n, for example, in a case where a skew of one magnetic pole is given, when the number of iron core pieces constituting the laminated iron core is P, a rotation of (360/Pn) has only to be produced in each of the iron core pieces.

Accordingly, in a case where the caulking hole is formed at a position of r from the rotation center at the skewing, the length of the gap formed in the circumferential direction of the caulking hole and in the same direction has only to be made (2πr/Pn).

Besides, in the case where the skew of the laminated iron core is made variable by one pole or more of the magnetic poles, for example, by multiple poles such as two poles or three poles, the gap corresponding thereto has only to be formed.

Incidentally, the caulking projection is also formed into the arc shape when viewed from the rotation center at the skewing, so that when the caulking projection is fitted in the caulking hole, the caulking projection can be smoothly rotated along the inside of the caulking hole.

Further, a contact area between the caulking hole and the caulking projection when the caulking projection is fitted in the caulking hole is made large, and a caulking lamination force between the respective iron core pieces can be made large.

Incidentally, although the shape at a time when the caulking projection is viewed from the side can be made, for example, a V shape, a U shape, or an inverted trapezoid, the shape is not be fixed.

Besides, according to the structure of (3), in the case where the plural iron core pieces are caulked and laminated by one caulking projection, the rotation force at the time when the iron core pieces are skewed is shared by the plural iron core pieces, the rotation of the iron core pieces can be made smooth, and the adjustment of rotation angles between the respective iron core pieces can be easily performed.

Besides, according to the structure of (4), the first caulking hole and the first caulking projection fitted in the first caulking hole are formed in each of the iron core pieces while the respective positions are successively changed, and the respective laminated iron core pieces are caulked and laminated while the caulking positions are alternately changed.

Besides, the second caulking hole formed to pass through the plural laminated iron core pieces and the second caulking projection fitted in the second caulking hole are formed in the respective iron core pieces while the respective positions are successively changed, and the plural iron core pieces to be laminated are caulked and laminated at once.

As stated above, the caulking joining is simultaneously performed by the first caulking hole, the first caulking projection, the second caulking hole, and the second caulking projection, so that the caulking lamination force of the laminated iron core pieces can be further raised, and the rotation force at the time when the laminated iron core is skewed can be shared by the plural iron core pieces.

Besides, since the rotation force of the iron core piece can be simultaneously transmitted to the plural iron core pieces, the adjustment of the rotation angle between the respective iron core pieces can be easily performed.

Besides, in the manufacturing method of (5), the caulking hole is formed in the lowermost layer iron core piece, and in the case where the caulking projections and the caulking holes are respectively formed in the iron core pieces except the lowermost layer at the different positions of the same radius from the rotation center at the skewing of the iron core piece, the caulking hole is formed to be longer than the caulking projection in the circumferential direction when viewed from the rotation center at the skewing, and the gap is formed in the circumferential direction when the caulking projection of the iron core piece of the upper layer is fitted in the caulking hole.

By this, between the respective iron core pieces subjected to the caulking lamination, the iron core piece of the upper layer can be rotated with respect to the iron core piece of the lower layer in the direction where the gap is formed, within the angle not larger than the center angle with the gap as the arc length, and around the rotation center at the skewing.

Accordingly, after the laminated iron core is formed, the respective iron core pieces constituting the laminated iron core are mutually rotated in the direction where the gap is formed, so that the freely shaped skew can be formed in the laminated iron core.

Besides, as common effects based on the structures of the skew shape variable laminated iron cores of (1) to (4), in the iron core pieces except the lowermost layer, the caulking projections and the caulking holes are respectively formed at the different positions of the same radius from the rotation center at the skewing of the iron core piece, the caulking hole is longer in the circumferential direction than the caulking projection fitted in the caulking hole, and when the caulking projection of the upper layer is put into the caulking hole of the iron core piece, the gap is formed in the circumferential direction of each of the caulking holes, and therefore, after the formation of the laminated iron core, the respective iron core pieces are mutually rotated around the rotation center at the skewing, and the freely shaped skew can be easily formed in the laminated iron core, and the optimum shape skew is determined according to the use mode of the motor or the use object and can be formed in the laminated iron core.

Besides, even in the case where a change in the specification of a use mode, a use object or the like occurs after the formation of the laminated iron core, the optimum shape skew can be easily formed in the laminated iron core according to the contents of the change, and it becomes possible to prevent the cogging phenomenon and the noise from occurring at the time of operation of the motor.

Besides, as effects by the structure of the skew shape variable laminated iron core of (2), since the caulking hole has the arc shape with reference to the rotation center when viewed from the plane, the caulking projection can be smoothly rotated along the inside of the caulking hole, and the respective iron core pieces are easily rotated around the rotation center at the skewing, and the freely shaped skew can be formed in the laminated iron core.

Besides, as effects of the structure of the skew shape variable laminated iron core of (3), since the caulking hole is formed to pass through the plural laminated iron core piece, and the caulking projection fitted in the caulking hole formed to pass through reaches to the lower part position of the caulking hole formed to pass through, the caulking lamination between the iron core pieces is firm, the adjustment of the rotation angle between the iron core pieces can be easily performed, and it becomes possible to easily form the freely shaped skew in the laminated iron core.

Besides, as effects of the structure of the skew shape variable laminated iron core of (4), the caulking holes include the first caulking hole formed in every second iron core piece of the iron core pieces in the lamination direction, and the second caulking hole formed to pass through the plural laminated iron core pieces at the position different from the first caulking hole, and the caulking projections include the first caulking projection reaching to the lower part position of the first caulking hole, and the second caulking projection reaching to the lower part position of the second caulking hole, and therefore, the caulking lamination force between the respective iron core pieces is further raised, the adjustment of the rotation angle between the respective iron core pieces can be easily performed, and it becomes possible to form the freely shaped skew in the laminated iron core easily and stably.

Besides, as effects of the manufacturing method of the skew shape variable laminated iron core of (5), there are included the step of forming the caulking hole in the lowermost layer iron core piece, and forming the caulking projections and the caulking holes respectively in the iron core pieces except the lowermost layer at the same radius position from the rotation center at the skewing and at the different positions, and the step of forming the laminated iron core by fitting the caulking projection of the iron core piece of the upper layer into the caulking hole of the iron core piece of the lower layer, the caulking hole is formed to be longer than the caulking projection in the direction of the circumference with the rotation axis as the center, and when the caulking projection of the iron core piece of the upper layer is fitted into the caulking hole of the iron core piece of the lower layer, the gap is formed between the caulking hole and the caulking projection in the circumferential direction, and therefore, after the laminated iron core is formed, the respective iron core pieces are rotated mutually around the rotation center in the same direction or the opposite direction thereto, so that the rotation angle between the respective iron core pieces is adjusted, and the freely shaped skew can be formed in the laminated iron core. Unlike the conventional technique, it becomes unnecessary that in order to manufacture laminated iron cores different in skew shape, a caulking projection formation punch is changed, or a rotation angle of a laminate die is changed, and it becomes possible to obtain laminated iron cores having various skew shapes easily and without raising the manufacturing cost.

BRIEF DESCRIPTION OF THE DRAWINGS

FIG. 2 is a partial development side sectional view of a caulking connecting part of the rotator laminated iron core of FIG. 1.

Figure 1:
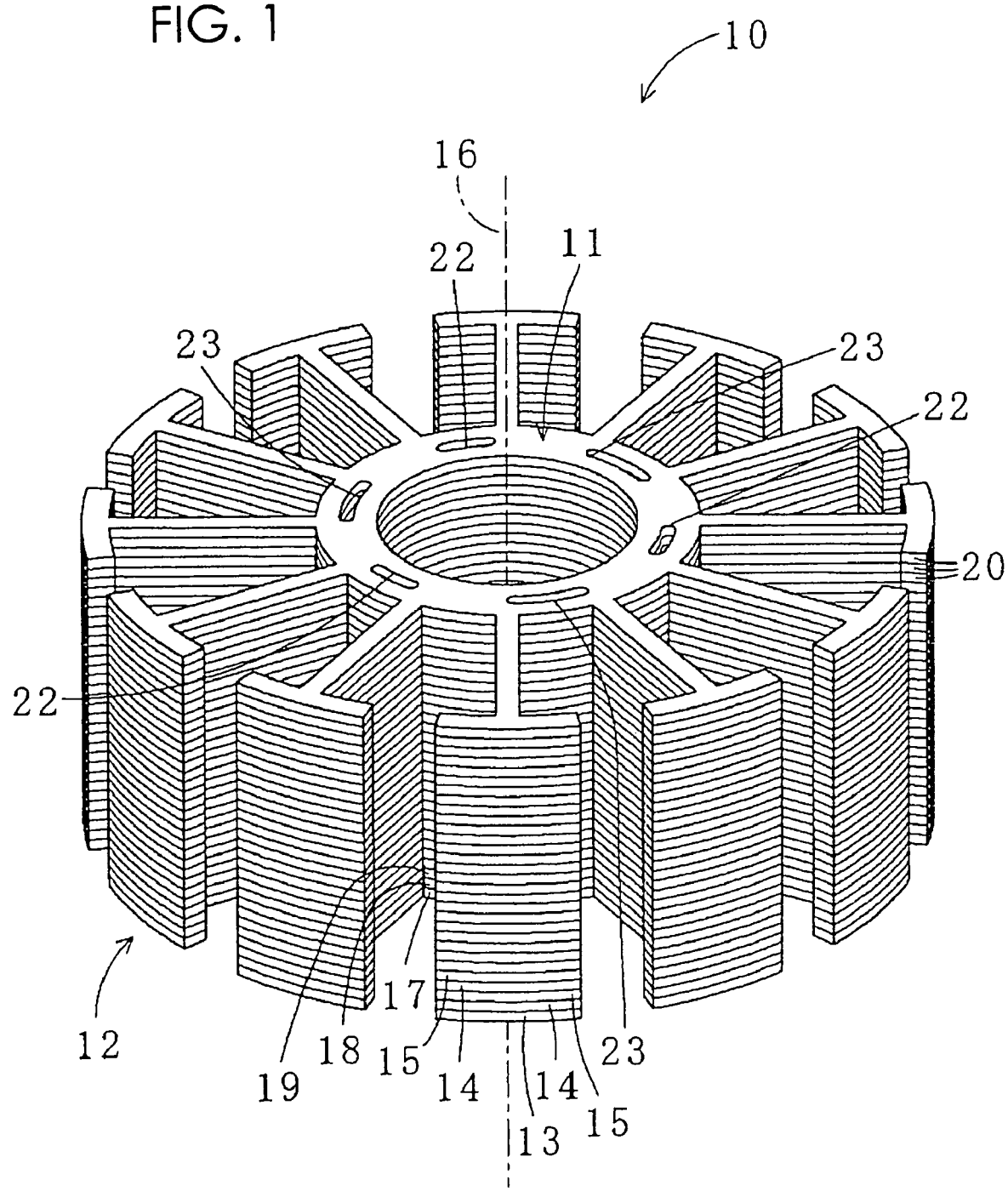
FIG. 1 is a perspective view of a skew shape variable rotator laminated iron core according to a first embodiment of the invention.

Incidentally, reference numerals in the drawings are as follows: 10: rotator laminated iron core, 11: boss part, 12: magnetic pole part, 13: lowermost layer iron core piece, 14, 15: iron core piece, 16: rotation center, 17 to 19: boss piece part, 20: magnetic pole piece part, 21: caulking hole, 22: caulking projection, 23: caulking hole, 24: caulking projection, 25: caulking hole, 26 to 28: skew, 29: thin plate strip material, 30: pilot hole, 30a: slot hole, 31: rotator laminated iron core, 32: boss part, 33: magnetic pole part, 34; lowermost layer iron core piece, 35 to 40: iron core piece, 41: rotation center, 42 to 48: boss piece part, 49: magnetic pole piece part, 50 to 57: caulking hole, 58, 59: caulking projection, 60 to 62, caulking hole: 63 to 65: caulking projection, 66 to 68: caulking hole, 69 to 71: caulking projection, 72 to 76: caulking hole, 77: caulking projection, 78, 79: caulking hole, 80 to 83: caulking projection, 84 to 87: caulking hole, 88, 89: caulking projection.

BEST MODE FOR CARRYING OUT THE INVENTION

Hereinafter, embodiments embodying the invention will be described with reference to the drawings.

Figure 3A:
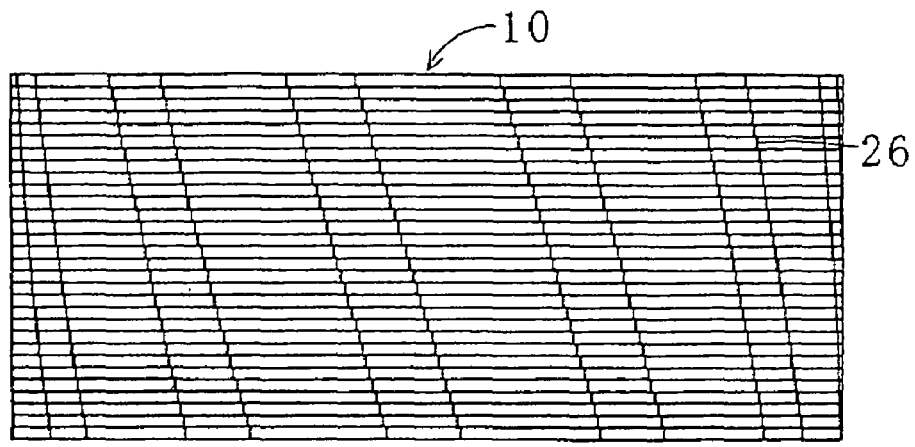
FIGS. 3A to 3C are respectively explanatory views of skew shapes formed in rotator laminated iron cores.
Figure 3B:
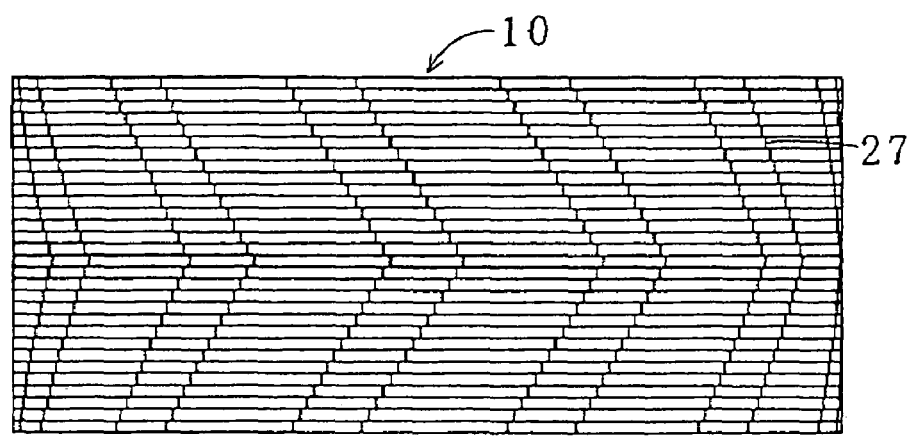
Figure 3C:
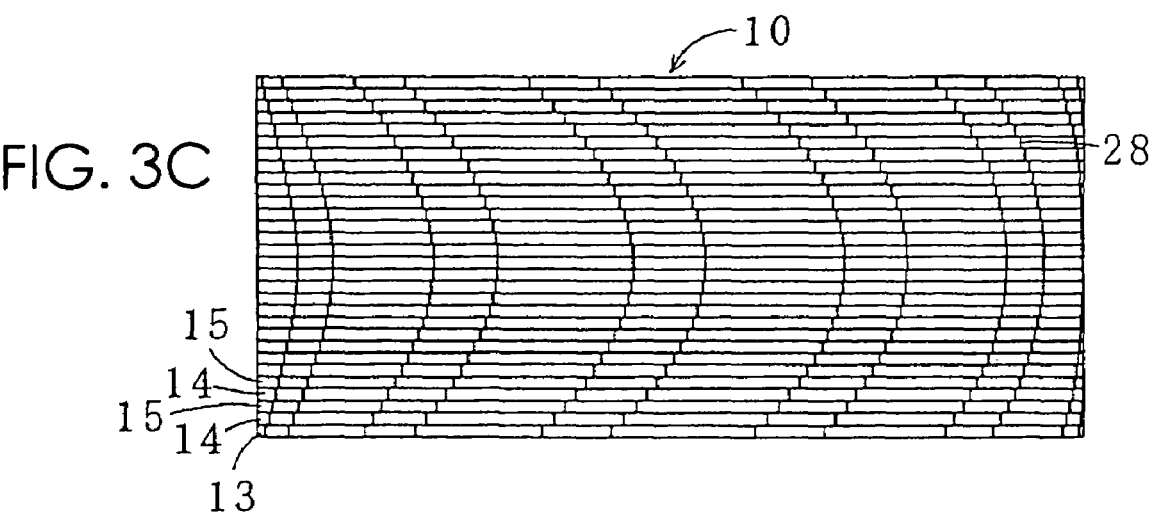
Figure 4:
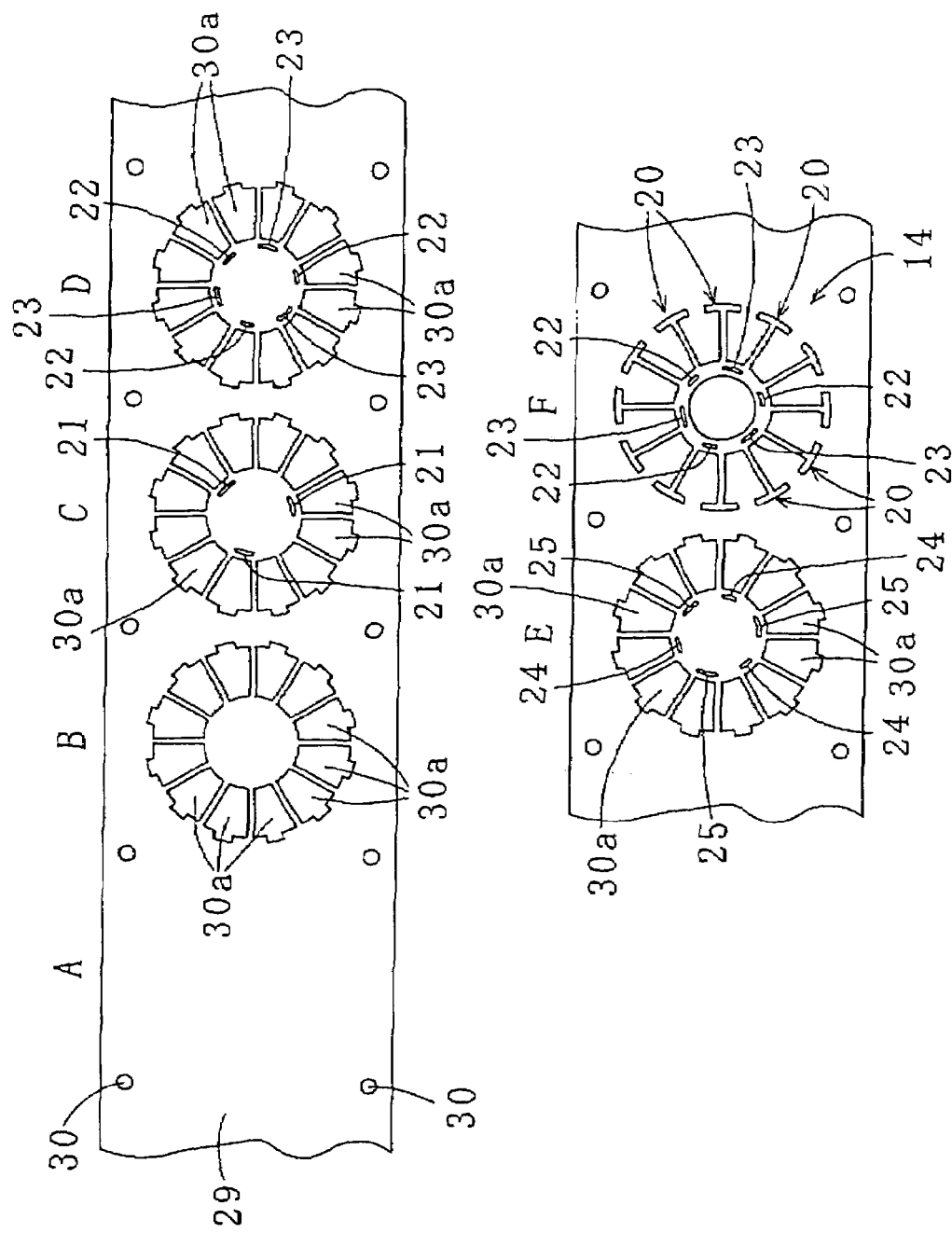
FIG. 4 is an explanatory view showing a formation process of an iron core piece in manufacture of the rotator laminated iron core.
Figure 5:
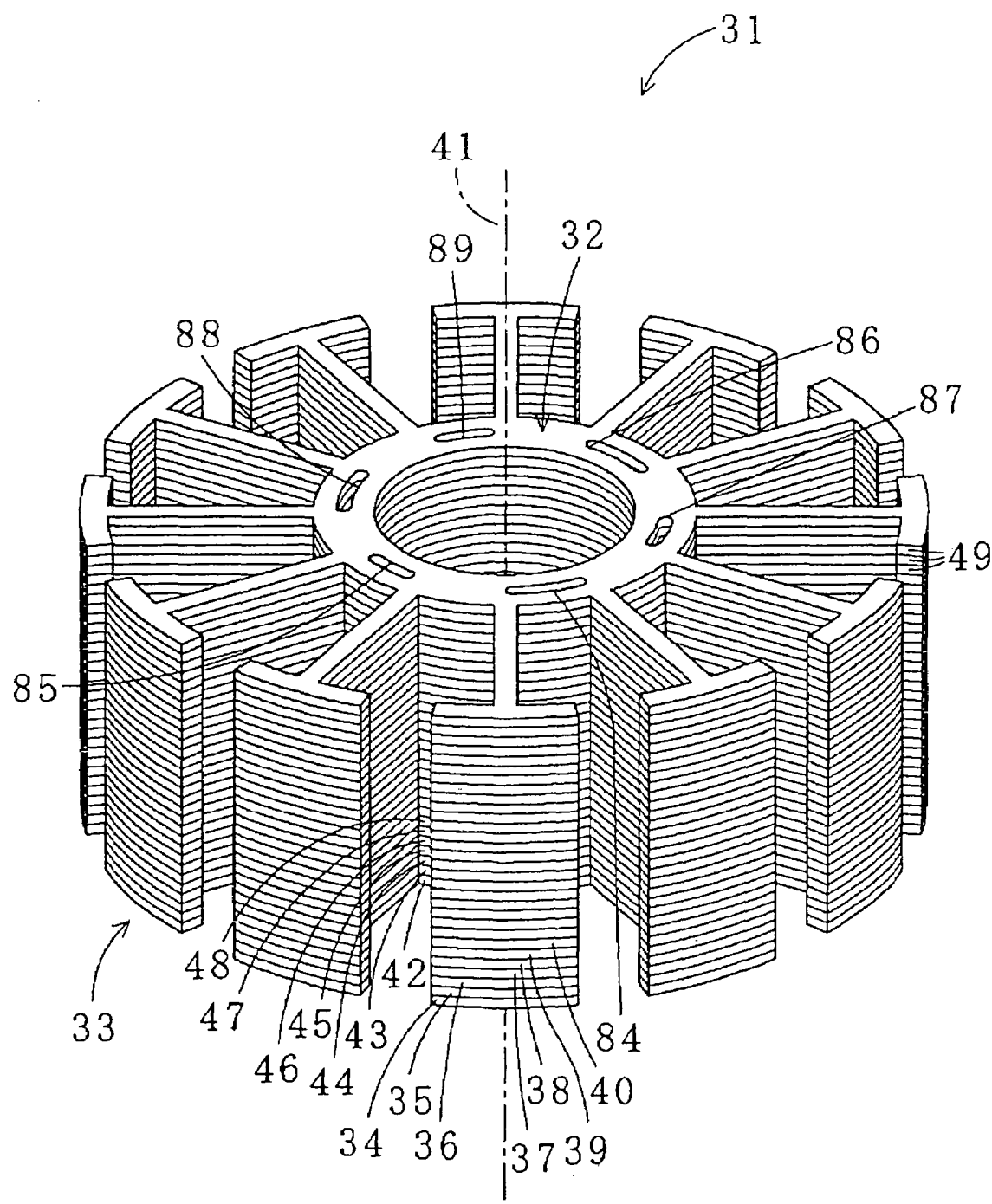
FIG. 5 is a perspective view of a skew shape variable rotator laminated iron core according to a second embodiment of the invention.
Figure 6:
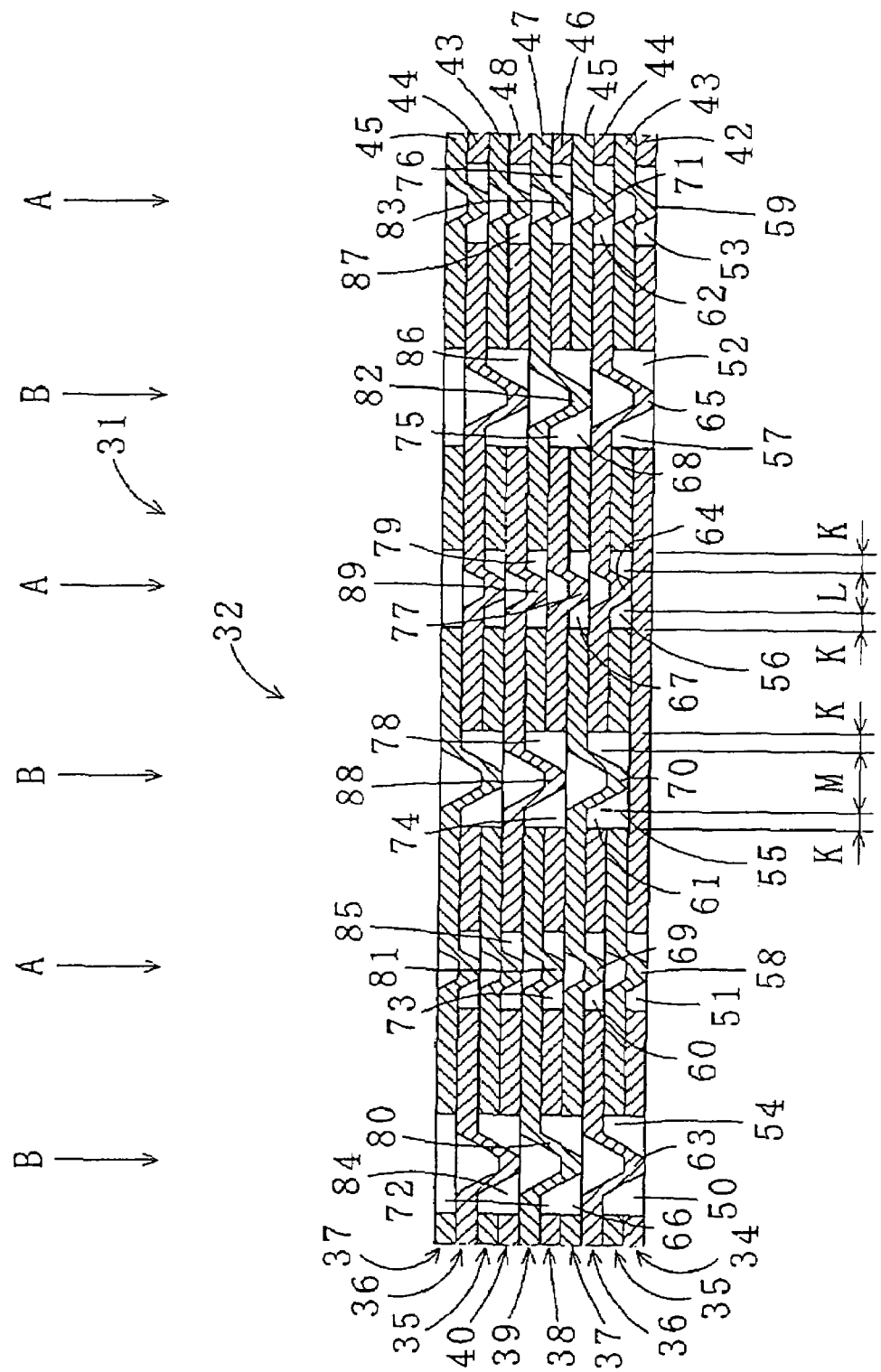
FIG. 6 is a partial development side sectional view of a caulking connecting part of the rotator laminated iron core of FIG. 5.

FIG. 1 is a perspective view of a skew shape variable rotator laminated iron core according to a first embodiment of the invention, FIG. 2 is a partial development side sectional view of a caulking connecting part of the rotator laminated iron core of FIG. 1, FIGS. 3A to 3C are respectively explanatory views of skew shapes formed in rotator laminated iron cores, FIG. 4 is an explanatory view showing a formation process of an iron core piece in manufacture of the rotator laminated iron core, FIG. 5 is a perspective view of a skew shape variable rotator laminated iron core according to a second embodiment of the invention, and FIG. 6 is a partial development side sectional view of a caulking connecting part of the rotator laminated iron core of FIG. 5.

As shown in FIG. 1 and FIG. 2, a rotator laminated iron core 10 of a motor as the skew shape variable laminated iron core according to the first embodiment of the invention includes twelve magnetic pole parts 12 radially provided at the periphery with reference to a center boss part 11.

Besides, the rotator laminated iron core 10 includes a lowermost layer iron core piece 13, and iron core pieces 14 and 15 alternately laminated thereon. The respective iron core pieces 13 to 15 have the same thickness and are formed to be axisymmetrical with respective to a rotation center 16. Hereinafter, these will be described in detail.

The respective iron core pieces 13 to 15 include boss piece parts 17 to 19 forming the boss part 11 and magnetic pole piece parts 20 whose bases are connected to these and which form the magnetic pole part 12.

Plural (for example, three) caulking holes 21 are formed at a center position of the boss piece part 17 in the radius direction and at positions where the periphery is divided into parts (for example, three equal parts).

Plural (for example, three) caulking projections 22 fitted in the plural caulking holes 21 of the iron core piece 13 are provided on the boss piece part 18 of the iron core piece 14, and further, plural (for example, three) caulking holes 23 are provided at intermediate positions of the respective caulking projections 22 and on the same periphery.

Besides, plural (for example, three) caulking projections 24 fitted in the plural caulking holes 23 of the iron core piece 14 are provided on the boss piece part 19 of the iron core piece 15, and plural (for example, three) caulking holes 25 are provided at intermediate positions of the respective caulking projections 24 and on the same periphery.

Accordingly, the iron core pieces 14 and 13 are laminated as the lower layers of the iron core piece 15, and the iron core pieces 14 and 15 are alternately laminated on the iron core piece 15 to form the rotator laminated iron core with a specified thickness.

Here, each of the caulking holes 21, 23 and 25 have the same shape and each of the caulking projections 22 and 24 have the same shape, and further, the caulking holes 21, 23 and 25 formed into arc shapes with reference to the rotation center 16 of the iron core pieces 13, 14 and 15 when viewed from a plane are formed to be longer in the circumferential direction than maximum extensions L of the caulking projections 22, 24 and 22 fitted in the caulking holes 21, 23 and 25. The caulking projections 22, 24, as viewed from the side can be made, for example, a V shape, a U shape, or an inverted trapezoidal shape. The shape is not limited to these, however.

Thus, in the case where the caulking projections 22, 24 and 22 of the immediately upper iron core pieces 14, 15 and 14 are respectively fitted in the caulking holes 21, 23 and 25 of the iron core pieces 13 to 15, gaps in the circumferential direction and in the same direction are formed in the respective caulking holes 21, 23 and 25, and each of the iron core pieces 13 to 15 adjacent to each other in the lamination direction rotates within a slight angle range, and as shown in FIGS. 3A to 3C, skews 26 to 28 having an inclined straight line shape, a V shape, an inclined curved line and the like at a variable angle can be given to the rotator laminated iron cores 10.

Subsequently, a manufacturing method of the rotator laminated iron core 10 will be described with reference to FIG. 4.

As shown in FIG. 4, a die apparatus for manufacturing the rotator laminated iron core 10 of the embodiment includes stations A to F, successively conveys a thin plate strip material 29 made of a magnetic steel plate from the station A to the station F, forms the iron core piece 13 and alternately the iron core pieces 14 and 15, and caulks and laminates them at the station F to assemble the rotator laminated iron core 10.

Hereinafter, steps of forming the iron core pieces 13 to 15 at the respective stations A to F will be described.

At the station A, pilot holes 30 for positioning the thin plate strip material 29 at the respective stations B to F are successively formed at both sides of the thin plate strip material 29.

At the station B, twelve slot holes 30a are formed in the successively conveyed thin plate strip material 29.

By this, the main contours of the boss piece parts 17 to 19 of the respective iron core pieces 13 to 15 and the magnetic pole piece parts 20 connected thereto are formed.

At the station C, the three caulking holes 21 of the iron core piece 13 are formed in the boss piece part 17.

The station C becomes an idle station for the iron core pieces 14 and 15 formed subsequently to the iron core piece 13.

At the station D, the three caulking holes 23 and the three caulking projections 22 are respectively formed on the boss piece part 18 of the iron core piece 14.

The station D becomes an idle station for the iron core pieces 13 and 15.

At the station E, the three caulking holes 25 and the three caulking projections 24 are respectively formed on the boss piece part 19 of the iron core piece 15.

The station E becomes an idle station for the iron core pieces 13 and 14.

By passing through the stations A to E, the iron core piece 13 of the lowermost layer having the caulking holes 21 is formed, and next, the iron core piece 14 having the caulking holes 23 and the caulking projections 22, and the iron core piece 15 having the caulking holes 25 and the caulking projections 24 are alternately formed.

At the station F, the outer shape and inner shape punching of the iron core pieces 13 to 15 are simultaneously performed, a specified number of iron core pieces 13 to 15 are caulked and laminated in the die, and the rotator laminated iron core 10 is formed.

In the iron core pieces 13 to 15 forming the rotator laminated iron core 10, each of the caulking holes 21, 22 and 23 is longer in the circumferential direction than each of the caulking projections 22, 23 and 22 fitted therein, and has gaps at both sides in the circumferential direction.

Incidentally, the caulking projections 22 and 24 have projection heights substantially equal to the thickness of the thin plate strip material 29, respectively reach to the bottom parts (lower part positions) of the caulking holes 21 and 23 (including 25), and firmly connect the upper and lower iron core pieces 13 to 15.

As shown in FIGS. 5 and 6, a rotator laminated iron core 31 of a motor as a skew shape variable rotator laminated iron core according to a second embodiment of the invention includes twelve magnetic pole parts 33 radially provided at the periphery with reference to a center boss part 32 (similarly to the rotator laminated iron core 10 according to the first embodiment).

Besides, the rotator laminated iron core 31 includes a lowermost layer iron core piece 34 and iron core pieces 35 to 40 repeatedly laminated thereon until a specified thickness is obtained, the respective iron core pieces 34 to 40 have the same thickness, and are formed to be axisymmetrical with respect to a rotation center 41 except for caulking holes and caulking projections explained below in detail. Hereinafter, these will be described in detail.

The respective iron core pieces 34 to 40 include boss piece parts 42 to 48 forming the boss part 32 and magnetic pole piece parts 49 (there are twelve parts in this embodiment) whose bases are connected to these and which form the magnetic pole part 33.

The respective iron core pieces 34 to 40 constituting the rotator laminated iron core 31 are caulked and laminated by first caulking parts A respectively formed at positions where the circumference is divided into three equal parts, and second caulking parts B respectively formed at intermediate positions of the first caulking parts A.

In the first caulking part A, similarly to the rotator laminated iron core 10 of the first embodiment, the immediately upper and lower iron core pieces 34 to 40 are connected through first caulking holes and first caulking projections fitted therein, which are described below in detail with reference to reference numbers in the drawing.

At the center position, in the radius direction, of the boss piece part 42 of the iron core piece 34, caulking holes 50 and 52 wide in the circumferential direction are formed at positions of 0 degree and 240 degrees (here, the position of the caulking hole 50 is made a reference), and caulking holes 51 and 53 narrow in the circumferential direction and constituting the first caulking holes are formed at positions of 60 degrees and 300 degrees.

In the boss piece part 43 of the iron core piece 35, wide caulking holes 54, 55 and 57 are formed at positions of 0 degree, 120 degrees and 240 degrees, and a narrow caulking hole 56 is formed at a position of 180 degrees.

The caulking hole 54 is formed while its center is coincident with the caulking hole 50 of the lower layer iron core piece 34, and the caulking hole 57 is formed while its center is coincident with the caulking hole 52 of the lower layer iron core piece 34. By this, a second caulking hole formed to pass through the two continuous iron core pieces is formed.

Further, in the boss piece part 43 of the iron core piece 35, a caulking projection 58 fitted in the narrow caulking hole 51 of the lower layer iron core piece 34 and a caulking projection 59 fitted in the caulking hole 53, which respectively constitute first caulking projections, are formed.

In the boss piece part 44 of the iron core piece 36, a wide caulking hole 61 is formed at a position of 120 degrees, and narrow caulking holes 60 and 62 are formed at positions of 60 degrees and 300 degrees. The caulking hole 60 and the caulking hole 51 of the lower layer iron core piece 34, the caulking hole 61 and the caulking hole 55 of the lower layer iron core 35, and the caulking hole 62 and the caulking hole 53 of the lower layer iron core piece 34 are formed so that their centers are respectively coincident with each other.

Besides, in the boss piece part 44 of the iron core piece 36, a second caulking projection 63 fitted in the caulking holes 50 and 54 (that is, the second caulking hole) passing through the lower layer iron core pieces 35 and 34, a caulking projection 64 fitted in the caulking hole 56 of the lower layer iron core piece 35, and a second caulking projection 65 fitted in the caulking holes 52 and 57 passing through the lower layer iron core pieces 35 and 34 are formed.

In the boss piece part 45 of the iron core piece 37, wide caulking holes 66 and 68 are formed at positions of 0 degree and 240 degrees, and a narrow caulking hole 67 is formed at a position of 80 degrees. The caulking hole 66 and the caulking holes 50 and 54 of the lower layer iron core pieces 34 and 35, the caulking hole 67 and the caulking hole 56 of the lower layer iron core piece 35, and the caulking hole 68 and the caulking holes 52 and 57 of the lower layer iron core pieces 34 and 35 are formed so that their centers are respectively coincident with each other.

Further, in the boss piece part 45 of the iron core piece 37, a caulking projection 69 fitted in the caulking hole 60 of the lower layer iron core piece 36, a second caulking projection 70 fitted in the caulking holes 55 and 61 passing through the lower layer iron core pieces 35 and 36, and a caulking projection 71 fitted in the caulking hole 62 of the lower layer iron core piece 36 are formed.

In the boss piece part 46 of the iron core piece 38, wide caulking holes 72, 74 and 75 are formed at positions of 0 degree, 120 degrees and 240 degrees, and narrow caulking holes 73 and 76 are formed at positions of 60 degrees and 300 degrees. The caulking hole 72 and the caulking holes 50, 54 and 66 of the lower layer iron core pieces 34, 35 and 37, the caulking hole 73 and the caulking holes 51 and 60 of the lower layer iron core pieces 34 and 36, the caulking hole 74 and the caulking holes 55 and 61 of the lower layer iron core pieces 35 and 36, the caulking hole 75 and the caulking holes 52, 57 and 68 of the lower layer iron core pieces 34, 35 and 37, and the caulking hole 76 and the caulking holes 53 and 62 of the lower layer iron core pieces 34 and 36 are formed so that their centers are respectively coincident with each other.

Further, in the boss piece part 46 of the iron core piece 38, a caulking projection 77 fitted in the caulking hole 67 is formed at a position of 180 degrees.

In the boss piece part 47 of the iron core piece 39, a wide caulking hole 78 is formed at a position of 120 degrees, and a narrow caulking hole 79 is formed at a position of 180 degrees. The caulking hole 78 and the caulking holes 55, 61 and 74 of the lower layer iron core pieces 35, 36 and 38, and the caulking hole 79 and the caulking holes 56 and 67 of the lower layer iron core pieces 35 and 37 are formed so that their centers are respectively coincident with each other.

Further, in the boss piece part 47 of the iron core piece 39, a second caulking projection 80 fitted in the caulking through holes 66 and 72 is formed at a position of 0 degree, a caulking projection 81 fitted in the caulking hole 73 of the lower layer iron core piece 38 is formed at a position of 60 degrees, a second caulking projection 82 fitted in the caulking holes 68 and 75 passing through the lower layer iron core pieces 37 and 38 is formed at a position of 240 degrees, and a caulking projection 83 fitted in the caulking hole 76 of the lower layer iron core piece 38 is formed at a position of 300 degrees.

In the boss piece part 48 of the iron core piece 40, wide caulking holes 84 and 86 are formed at positions of 0 degree and 240 degrees, and narrow caulking holes 85 and 87 are formed at positions of 60 degrees and 300 degrees.

The caulking hole 84 and the caulking holes 50, 54, 66 72 of the lower layer iron core pieces 34, 35, 37 and 38, the caulking hole 85 and the caulking holes 51, 60 and 73 of the lower layer iron core pieces 34, 36 and 38, the caulking hole 86 and the caulking holes 52, 57, 68 and 75 of the lower layer iron core pieces 34, 35, 37 and 38, and the caulking hole 87 and the caulking holes 53, 62 and 76 of the lower layer iron core pieces 34, 36 and 38 are formed so that their centers are respectively coincident with each other.

Further, in the boss piece part 48 of the iron core piece 40, a second caulking projection 88 fitted in the caulking through holes 74 and 78 is formed at a position of 120 degrees, and a caulking projection 89 fitted in the caulking hole 79 of the lower layer iron core piece 39 is formed at a position of 180 degrees.

Accordingly, the iron core pieces 35 to 40 are repeatedly laminated on the iron core piece 34 up to a specified thickness and form the rotator laminated iron core 31.

Here, the respective wide caulking holes 50, 52, 54, 55, 57, 61, 66, 68, 72, 74, 75, 78, 84 and 86 and the respective narrow caulking holes 51, 53, 56, 60, 62, 67, 73, 76, 79, 85 and 87 have respectively the same shapes, and are respectively formed into arc shapes, when viewed from a plane, at positions of the same radius position with reference to the rotation center 41.

Besides, the respective caulking projections 58, 59, 64, 69, 71, 77, 81, 83 and 89 and the respective caulking projections 63, 65, 70, 80, 82 and 88 have respectively the same shapes, and are formed at positions of the same radius with reference to the rotation center 41.

Incidentally, naturally, each of the second caulking projections reaches to the lower part position of the second caulking hole, and the respective iron core pieces are firmly connected.

When the second caulking projection is fitted in the second caulking hole including the wide caulking holes, since each of the second caulking holes is opened to be longer in the circumferential direction than a maximum extension M of the fitted second caulking projection, a gap K in the circumferential direction is formed in each of the second caulking holes.

Besides, also in the case where the first caulking projection is fitted in the narrow caulking hole forming the first caulking hole, since it is opened to be longer in the circumferential direction than a maximum extension L of the fitted first caulking projection, a gap K in the circumferential direction is formed in each of the first caulking holes.

Thus, the iron core pieces 34 to 40 adjacent to each other in the vertical direction can be respectively rotated within a slight angle range, and a skew with an inclined straight line shape, an inclined curved line shape, a V shape or the like at a variable angle can be given to the rotator laminated iron core 31.

Although the embodiments of the invention have been described, the invention is not limited to the embodiments, but can be modified within the scope in which the gist of the invention is not changed, and a case where a part of or all of the respective embodiments and modified examples are combined to construct the skew shape variable rotator laminated iron core of the invention and the manufacturing method of the same, is also contained in the scope of right of the invention.

For example, in the embodiment of the invention, although the number of magnetic pole parts is 12, the number may be 11 or less or 13 or more.

Besides, although the skew shape variable rotator laminated iron core is formed while the iron core pieces are caulked and laminated one by one, the skew shape variable rotator laminated iron core may be formed while the arrangement of the caulking projections and the caulking holes is suitably changed and the three or more continuous iron core pieces are caulked and laminated at once.

In the rotator laminated iron cores of the first and the second embodiments, although the caulking parts are provided at positions where each of the boss piece parts is divided into six equal parts, the invention can be applied also to a case where the caulking parts are formed at positions by fewer angle divisions (for example, divided into 5 or less equal parts) or by more angle divisions (for example, divided into 7 or more equal parts).

In the rotator laminated iron core of the second embodiment, the invention can also be applied to a case where the first caulking parts A are omitted, and the rotator laminated iron core is formed of only the second caulking parts B, and a case where the number of the plural vertically continuous iron core pieces is increased and the second caulking hole is formed.

Besides, although the skew shape variable rotator laminated iron core is formed while the iron core pieces are caulked and laminated one by one, and the two continuous iron core pieces are caulked and laminated at once at the different position, the skew shape variable rotator laminated iron core can also be formed while the iron core pieces are caulked and laminated one by one, and three or more iron core pieces are caulked and laminated at once at the different position.

Further, in the first and the second embodiments, although the case of the rotator laminated iron core has been described as an example of the skew shape variable rotator laminated iron core, the invention can be applied to a stator laminated iron core, or a laminated iron core with a shape which becomes symmetric with respect to a point when viewed from a plane.

Incidentally, the invention is not limited to the foregoing embodiments.

INDUSTRIAL APPLICABILITY

In the skew shape variable laminated iron core and the manufacturing method of the same as recited in claims 1 to 5, the skew shape variable laminated iron core and the manufacturing method of the same can be realized in which even after the caulking lamination, the skew shape can be freely changed according to various uses of the motor, and therefore, the industrial applicability is very great.

The invention claimed is:

1. A skew shape variable laminated iron core in which plural iron core pieces are laminated through caulking projections and caulking holes in which the caulking projections are fitted,
   characterized in that in the iron core pieces except a lowermost layer, the caulking projections and the caulking holes are respectively formed at different positions of a same radius from a rotation center at skewing of the iron core pieces, and the caulking hole has an arc shape as viewed from the rotation center and is longer in a circumferential direction than the caulking projection fitted in the caulking hole, and when the caulking projection of the iron core piece of an upper layer is fitted in the caulking hole of the iron core piece of a lower layer under the upper layer, a gap is formed in the circumferential direction of each of the caulking holes,
   wherein with the upper and lower layers laminated together and the caulking projection of the iron core piece of the upper layer fitted in the caulking hole of the iron core piece of the lower layer, the caulking projection of the iron core piece of the upper layer is movable circumferentially within the caulking hole of the iron core piece of the lower layer to thereby allow the laminated iron core pieces of the upper and lower layers to move relative to each other around the rotation center a predetermined amount, as determined by relative circumferential dimensions of the caulking projection of the core piece in the upper layer and caulking hole of the iron core piece of the lower layer.

2. The skew shape variable laminated iron core as recited in claim 1, characterized in that a caulking hole is formed to pass through the plural laminated iron core pieces, and the caulking projection fitted in the caulking hole formed to pass through reaches to a lower part position of the caulking hole formed to pass through.

3. The skew shape variable laminated iron core as recited in claim 1, characterized in that
   the caulking holes include a first caulking hole formed in every second iron core piece of the iron core pieces in a lamination direction, and a second caulking hole formed at a position different from the first caulking hole and to pass through the plural laminated iron core pieces, and
   the caulking projections include a first caulking projection reaching to a lower part position of the first caulking hole, and a second caulking projection reaching to a lower part position of the second caulking hole.

4. A manufacturing method of a skew shape variable laminated iron core, comprising:
   forming a caulking hole in a lowermost layer iron core piece, and forming caulking projections and caulking holes respectively in iron core pieces except the lowermost layer at a same radius position from a rotation center at skewing and at different positions, and
   forming a laminated iron core by fitting the caulking projection of the iron core piece of an upper layer into the caulking hole of the iron core piece of a lower layer,
   characterized in that the caulking hole of the iron core piece in the lower layer has an arc shape as viewed from the rotating center and is formed to be longer than the caulking projection in a circumferential direction with respect to the rotation axis as a center, and when the caulking projection of the iron core piece of the upper layer is fitted into the caulking hole of the iron core piece of the lower layer, a gap is formed between the caulking hole in the iron core piece in the lower layer and the caulking projection of the iron core piece in the upper layer and in the circumferential direction, and after laminating the iron core piece in the upper and lower layers, relatively moving the laminated iron core pieces in the upper and lower layers relative to the rotation center and thereby causing the caulking projection of the iron core piece of the upper layer to move circumferentially within the caulking hole of the iron core piece of the lower layer a predetermined amount as determined by relative circumferential dimensions of the caulking projection of the core piece in the upper layer and the caulking hole of the iron core piece of the lower layer.

5. The skew shape variable laminated iron core as recited in claim 1 wherein the plural iron core pieces are each punched out by a die apparatus.

6. The skew shape variable laminated iron core as recited in claim 1 wherein the caulking projections have one of a V shape, a U shape and an inverted trapezoidal shape.

7. The skew shape variable laminated iron core as recited in claim 6 wherein the caulking projections have a top that is each positioned approximately at a center.

8. The skew shape variable laminated iron core as recited in claim 4 further comprising the step of punching out a plurality of the iron core pieces by a die apparatus.

9. The skew shape variable laminated iron core as recited in claim 4 wherein the step of forming the caulking projections comprises forming the caulking projections to have one of a "V", "U", and inverted trapezoidal shape.

10. The skew shape variable laminated iron core as recited in claim 9 wherein the caulking projections have a top that is each positioned approximately at a center.

11. The skew shape variable laminated iron core as recited in claim 1 characterized in that the caulking hole has an arc shape when viewed from the rotation center at the skewing.

* * * * *